(12) United States Patent
Emberty et al.

(10) Patent No.: US 6,290,400 B1
(45) Date of Patent: Sep. 18, 2001

(54) SELF-HEALING OPTICAL BACKPLANE FOR COUPLING COMPONENTS

(75) Inventors: Robert George Emberty; Craig Anthony Klein, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,548

(22) Filed: Jan. 4, 2000

(51) Int. Cl.[7] ....................................................... G02B 6/36
(52) U.S. Cl. .................................. 385/53; 385/88; 385/89
(58) Field of Search ........................................ 385/53–93

(56) References Cited

U.S. PATENT DOCUMENTS

| | | |
|---|---|---|
| 4,277,135 * | 7/1981 | Schrott et al. ........................ 385/53 |
| 5,155,785 | 10/1992 | Holland et al. . |
| 5,386,487 | 1/1995 | Briggs et al. . |
| 5,533,188 | 7/1996 | Palumbo . |
| 5,606,161 | 2/1997 | Schulz . |
| 5,712,942 | 1/1998 | Jennings et al. . |
| 5,793,909 | 8/1998 | Leone et al. . |
| 5,793,919 | 8/1998 | Payne et al. . |
| 5,896,387 | 4/1999 | Fujita et al. . |
| 5,901,262 | 5/1999 | Kobayashi et al. . |

* cited by examiner

*Primary Examiner*—John D. Lee
(74) *Attorney, Agent, or Firm*—Robert M. Sullivan; Bracewell & Patterson, L.L.P.

(57) ABSTRACT

An array of independent disk drive assemblies are interconnected to a fiber optic cable in a backplane. Each drive assembly has an optics interface for engaging one of a series of connectors on the backplane. Data is accessed and stored on the disk drives by a host computer via operational signals sent through the cable. The drives are hot-pluggable into the cable connectors through their interfaces. The connectors have pivot members that are movable between open and closed positions. The cable is joined to each pivot member such that a single optical joint is formed at each connector. The interfaces on the drives plug into the pivot members to access the data on the cable. When a drive is removed from a connector, the pivot members close and allow the optical transmission to continue downstream on the cable with minimal signal losses.

12 Claims, 2 Drawing Sheets

SELF-HEALING OPTICAL BACKPLANE FOR COUPLING COMPONENTS

BACKGROUND OF THE INVENTION

1. Technical Field

This invention relates in general to optical connectors, and in particular to a backplane for distributing operational signals to an array of independent disk drives through optical, self-healing interface connections.

2. Description of Related Art

In one type of a redundant array of independent hard disk drives (RAID), the individual disk drives receive operational signals from the host computer through a fiber optic backplane. A single fiber optic cable extends along the backplane and is distributed to a series of fiber optic junctions. The fiber optic junctions must be readily equipped to detach from one disk drive and reattached to another since some of the drives will inevitably fail, and some applications require the drives to be frequently replaced. When a drive is removed from a junction, the junction must relay the optical transmission downstream with minimal losses. Unfortunately, each prior art, fiber optic junction typically causes about 6 dB in losses in the transmission of the signal. Thus, although prior art designs are workable, a more efficient optical junction for disk drive fiber optic cable backplanes is needed.

SUMMARY OF THE INVENTION

An array of independent disk drive assemblies are interconnected to a fiber optic cable in a backplane. Each drive assembly has an optics interface for engaging one of a series of connectors on the backplane. Data is accessed and stored on the disk drives by a host computer via operational signals sent through the cable. The drives are hot-pluggable into the cable connectors through their interfaces. The connectors have pivot members that are movable between open and closed positions. The cable is joined to each pivot member such that a single optical joint is formed at each connector. The interfaces on the drives plug into the pivot members to access the data on the cable. When a drive is removed from a connector, the pivot members close and allow the optical transmission to continue downstream on the cable with minimal signal losses.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
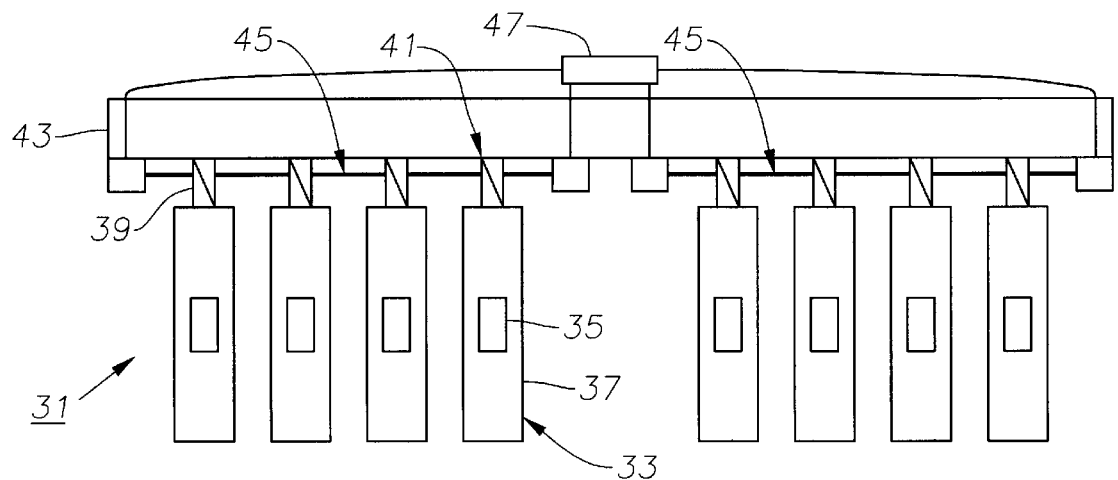
FIG. 1 is a schematic drawing of a first embodiment of an array of independent disk drives having a fiber optic backplane constructed in accordance with the invention.
Figure 2:
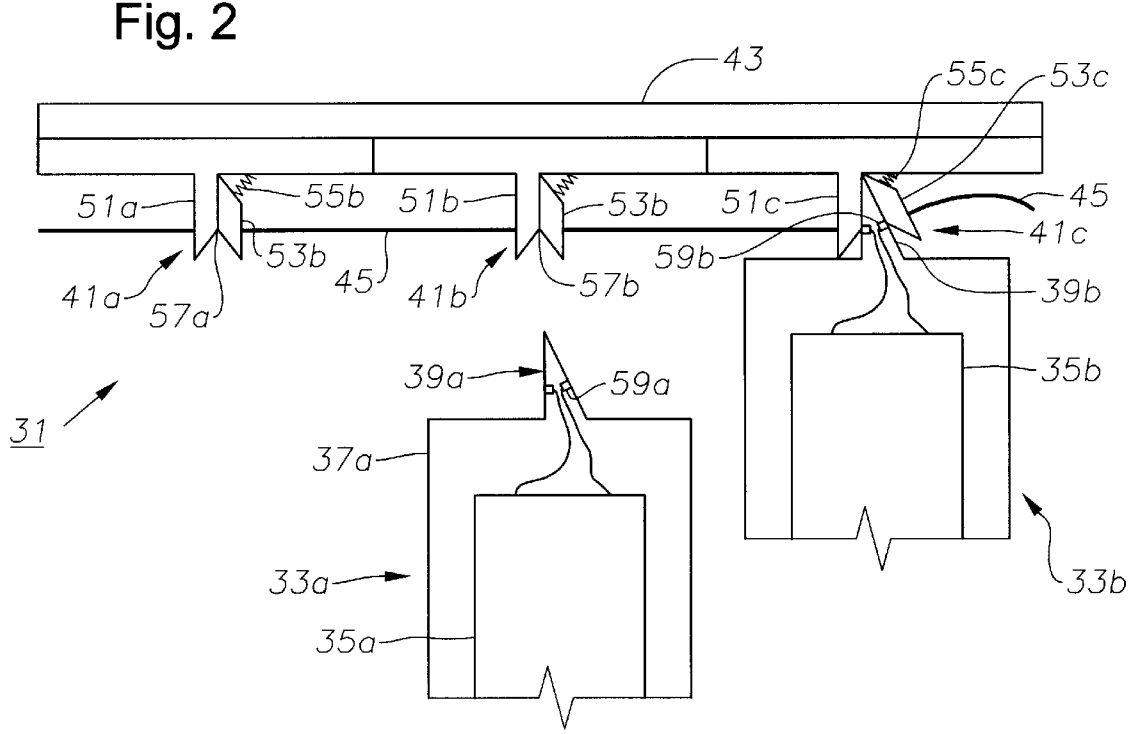
FIG. 2 is an enlarged schematic drawing of a portion of the array of independent disk drives and fiber optic backplane of FIG. 1.

Referring to FIGS. 1 and 2, a system and method for forming self-healing optical couplings between component interfaces is shown. For purposes of illustration, a computer data access and storage device such as a hard disk drive storage subsystem 31 is described. However, the system and method of the present invention may also be applied to various other components as well, such as a computer mainframe, tape drives, solid state memory, and optical devices.

In the embodiment shown, subsystem 31 comprises a redundant array of independent disk drive assemblies 33, each of which is located in a drawer. Each disk drive assembly 33 contains one disk drive 35 such as those commonly known in the art for accessing and storing data. Each disk drive 35 is mounted to and carried by a tray or carrier 37 for ease of inserting and removing disk drives 35 relative to the drawers. Each carrier 37 is provided with a fiber optic communications interface 39 for interfacing with a mating fiber optic junction or interface connector 41 on a component or optical backplane 43. Connectors 41 are substantially equal in number to the number of drive assemblies 33 and interconnected in series through a main fiber optic cable 45 with a host computer 47. Data is accessed and stored on disk drives 35 by computer 47 via operational signals sent through the optical circuit on backplane 43, cable 45, and connectors 41.

As shown in FIG. 2, disk drive assemblies 33 are readily equipped to detach from one fiber optic interface connector 41 and reattach to another since some applications require drive assemblies 33 to be frequently replaced. Each connector 41 comprises a stationary base 51, a movable door 53, and a spring-loaded hinge 55 therebetween. Hinge 55 pivots and biases door 53 to a closed position (see connectors 41a, 41b) for closing the optical circuit, but allows door 53 to move to an inclined open position as well (see connector 41c) for exposing a connection point in the optical circuit. Cable 45 extends and is joined to each base 51 and door 53, such that a single optical joint between an optical transmitter/receiver pair 59 is formed when door 53 is in the closed position. When door 53 is in the closed position, the single joint formed in connector 41 transmits the undriven optical signal to the next connector 41 with a maximum loss of 3 dB per connector 41, but the loss will most likely fall within the range of approximately 1 to 3 dB per connector 41.

The end of each connector 41 is provided with a tapered groove 57 for receiving the interface 39 of one of the drive assemblies 33. Groove 57 is defined between each paired base 51 and door 53. Interfaces 39 have tapers that are complementary in shape to grooves 57 so that drive assemblies 33 may be easily inserted into and removed from connectors 41. As illustrated at connector 41c on the right side of FIG. 2, the tip of interface 39b of drive assembly 33b plugs between base 51c and door 53c. Optical transmitter/receiver pair 59b located within interface 39b registers and aligns with the ends of cable 45 inside connector 41c. The optical transmission on cable 45 is received by drive 35b and then transmitted downstream with no signal losses since signal is redriven at drive 35b. The signal is similarly handled at each drive 35 in the series. When a drive assembly 33 is removed from a junction (such as drive 33a from junction 41b), door 53b pivots back into contact with base 51b to close the connection and allow the optical transmission to continue downstream on cable 45.

Figure 3:
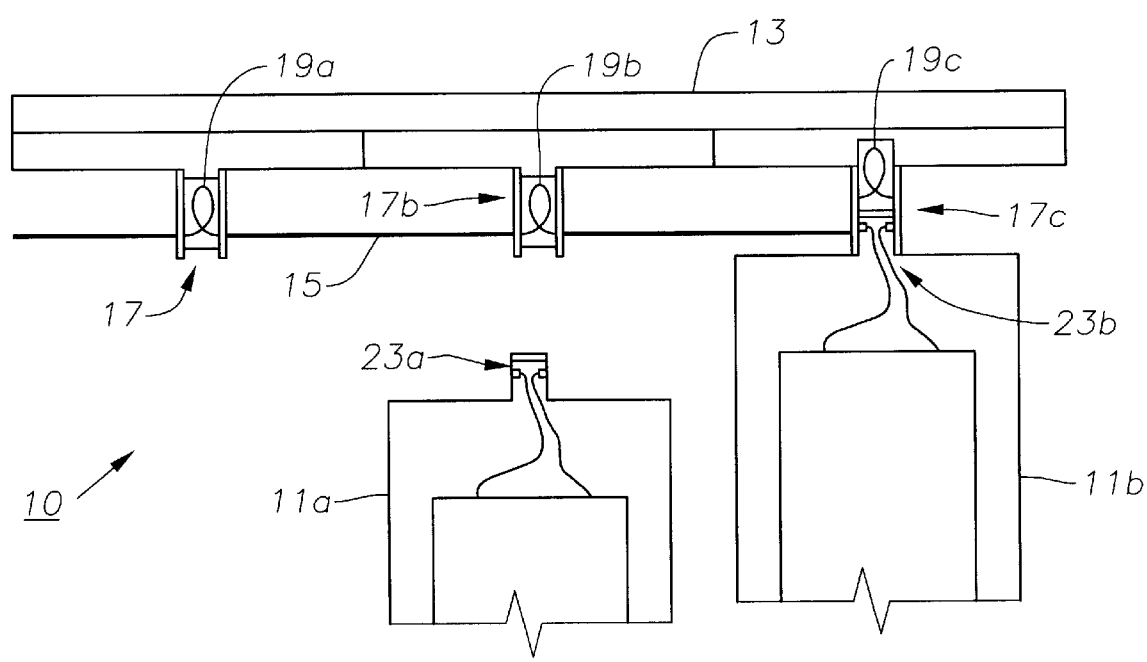
FIG. 3 is a schematic drawing of a second embodiment of the array of independent disk drives and fiber optic backplane of FIG. 1.

Referring now to FIG. 3, a second embodiment of the invention is illustrated for a storage subsystem 10 of hard disk drives. Subsystem 10 is substantially identical to subsystem 31 except for its optical connections. The individual disk drives 11 receive operational signals from the host computer through a fiber optic backplane 13. A single fiber optic cable 15 extends along the backplane and is distributed to a series of fiber optic junctions 17 that are equal to the number of disk drives 11. Like junctions 41, junctions 17 are equipped to detach from one disk drive 11 and reattached to another since some applications require drives 11 to be frequently replaced.

Fiber optic junction 17 for backplane 13 uses a small loop 19 of fiber optic cable. Each end of a loop 19 movably registers with main cable 15. When drive 11b is plugged into junction 17c, the loop 19c is displaced from the interface, and the fiber optic connector 23b on drive 11b is inserted in its place. Connector 23b has two fiber optic ends that register with the two ends of main cable 15 at junction 17c so that the optical transmission on cable 15 may be received by drive 11b and then transmitted downstream to the other drives 11 in series without losses in the signal. When a drive is removed from a junction (such as drive 11a from junction 17b), the loop 19b moves back into the junction 17b so the transmission continues downstream. The two fiber optic ends required by this type of fiber optic junction causes a maximum loss of 3 dB in signal per end, or 6 dB per junction.

The invention has several advantages including the minimization of transmission signal strength losses along the main fiber optic cable of the backplane. The backplane connectors of the first embodiment diminishes the optical signal by a maximum loss of only 3 dB per connector, and those of the second embodiment diminish the signal by a maximum loss of only 6 dB per connector. The array of independent disk drives are readily inserted or removed from any of the fiber optic connectors on the backplane with a reliable mechanical interface. In this sense, the connectors are "self-healing" when the doors of the connectors pivot back into proximity and contact with their respective bases. No user intervention is required to ensure reconnection of the main fiber optic cable. In this regard, the drive assemblies are "hot-pluggable" into the optic cable backplane and transmission need not be interrupted to insert or remove the drive assemblies.

While the invention has been shown or described in only some of its forms, it should be apparent to those skilled in the art that it is not so limited, but is susceptible to various changes without departing from the scope of the invention.

What is claimed is:

1. A system for optically coupling components, comprising:
    a first component having a fiber optic cable for forming an optical circuit;
    an optical connector mounted to the first component and interconnected with the fiber optic cable, the optical connector having a movable member that is biased to a closed position for closing the optical circuit at a single joint, and the movable member being movable to an open position for exposing a connection point in the optical circuit;
    a second component having an optical interface for moving the movable member to the open position when the optical interface is inserted into the optical connector, such that the second component is optically interconnected to the first component through the fiber optic cable, and wherein the movable member moves to the closed position when the optical interface of the second component is removed from the optical connector such that the second component is disconnected from the first component; wherein
        the optical connector is capable of transmitting a signal through the fiber optic cable regardless of whether the optical interface is inserted into or removed from the optical connector; and wherein
        the optical interface of the second component is tapered and the movable member defines a groove that is complementary in shape to the tapered optical interface such that the optical interface and the movable member slidaby engage each other.

2. The system of claim 1 wherein the optical connector causes a loss of approximately 1 to 3 dB in the optical circuit when the movable member is in the closed position.

3. A system for optically coupling components, comprising:
    a first component having a fiber optic cable for forming an optical circuit;
    a set of optical connectors mounted to the first component and interconnected with the fiber optic cable, each of the optical connectors having a pivot member that is biased to a closed position for closing the optical circuit at a single joint, and being pivotable to an open position for exposing a connection point in the optical circuit;
    a plurality of second components, each having an optical interface that is individually hot-pluggable into the optical circuit for moving respective ones of the pivot members of the optical connectors to the open position when inserted therein, such that the second components are optically interconnected to the first component through the fiber optic cable, and wherein the pivot members move to the closed position when the optical interfaces of the second components are removed from the optical connectors such that the second components are disconnected from the first component; wherein
        the optical connectors are capable of transmitting a signal through the fiber optic cable regardless of whether the optical interfaces are inserted into or removed from the optical connectors; and wherein
        each of the optical connectors has a stationary portion mounted to the first component and the pivot members are spring-biased relative thereto for moving between the open and closed positions.

4. The system of claim 3 wherein each of the optical connectors causes a loss of approximately 1 to 3 dB in the optical circuit when their respective pivot members are in the closed position.

5. A data access and storage device for a computer, comprising:
    a backplane having a fiber optic cable that is adapted to be connected to a computer for forming an optical circuit;
    a disk drive assembly having a carrier, a disk drive mounted to the carrier, and an optical interface connected to the disk drive;
    an optical connector mounted to the backplane and interconnected with the fiber optic cable, the optical connector having a movable member that is biased to a closed position for closing the optical circuit at a single joint, and the movable member being movable to an open position for exposing a connection point in the optical circuit; and wherein
    the optical interface of the disk drive assembly moves the movable member to the open position when the optical interface is inserted into the optical connector, such that the disk drive is interconnected to the fiber optic cable, and the movable member moves to the closed position when the optical interface of the disk drive assembly is removed from the optical connector.

6. The data access and storage device of claim 5 wherein the optical interface of the disk drive assembly is tapered and the movable member defines a groove that is complementary in shape to the tapered optical interface such that the optical interface and the movable member slidaby engage each other.

7. The data access and storage device of claim 5 wherein the optical connector has a stationary portion mounted to the backplane and the movable member is spring-biased relative thereto.

8. The data access and storage device of claim 5 wherein the optical connector causes a loss of approximately 1 to 3 dB in the optical circuit when the movable member is in the closed position.

9. A data access and storage device for a computer, comprising:
    a backplane having a fiber optic cable that is adapted to be connected to a computer for forming an optical circuit;
    a plurality of disk drive assemblies, each having a carrier, a disk drive mounted to the carrier, and an optical interface connected to the disk drive;
    a series of optical connectors mounted to the backplane and interconnected with the fiber optic cable, each of the optical connectors having a pivot member that is biased to a closed position for closing the optical circuit at a single joint, and being pivotable to an open position for exposing a connection point in the optical circuit; and wherein
    the optical interfaces of each of the disk drive assemblies are individually hot-pluggable into the optical circuit by moving the pivot members of the optical connectors to the open position when the optical interfaces are inserted into the optical connectors, such that the disk drives are interconnected to the fiber optic cable and adapted to allow the computer to access and store data therein, and the pivot members move to the closed position when the optical interfaces of the disk drive assemblies are removed from the optical connectors.

10. The data access and storage device of claim 9 wherein each of the optical interfaces of the disk drive assemblies is tapered and each of the pivot members defines a groove that is complementary in shape to the tapered optical interfaces.

11. The data access and storage device of claim 9 wherein each of the optical connectors has a stationary portion mounted to the backplane and the pivot members are spring-biased relative thereto for moving between the open and closed positions.

12. The data access and storage device of claim 9 wherein each of the optical connectors causes a loss of approximately 1 to 3 dB in the optical circuit when their respective pivot members are in the closed position.

* * * * *